United States Patent [19]

Saroya

[11] Patent Number: 5,491,327
[45] Date of Patent: Feb. 13, 1996

[54] UNIVERSAL MAGNETIC MEDIUM ENCODER WITH TILT-COMPENSATING APPARATUS

[75] Inventor: Jagtar S. Saroya, San Pedro, Calif.

[73] Assignee: American Magnetics Corporation, Torrance, Calif.

[21] Appl. No.: 288,497

[22] Filed: Aug. 10, 1994

[51] Int. Cl.$^6$ .............................. G06K 7/04; G06K 7/08
[52] U.S. Cl. ............................................ 235/449; 235/446
[58] Field of Search ........................... 33/129, 132 R, 33/142, 136, 133; 360/2, 103, 104, 130.32; 235/449, 482, 474, 446; 267/158, 160, 162

[56] References Cited

U.S. PATENT DOCUMENTS

| | | | |
|---|---|---|---|
| 3,994,483 | 11/1976 | Perucchi et al. | 267/160 |
| 4,518,853 | 5/1985 | Gabel et al. | 235/449 |
| 4,585,929 | 4/1986 | Brown et al. | 235/449 |
| 4,593,328 | 6/1986 | Baus, Jr. | 235/482 X |
| 4,598,479 | 7/1986 | Baus | 33/129 X |
| 4,731,685 | 3/1988 | Orcutt | 360/104 X |
| 4,937,438 | 6/1990 | Warwick et al. | 235/479 X |

FOREIGN PATENT DOCUMENTS

| | | | |
|---|---|---|---|
| 0113168 | 9/1980 | Japan | 360/130.32 |
| 2125514 | 3/1984 | United Kingdom | 267/158 |

*Primary Examiner*—John Shepperd
*Assistant Examiner*—Thien Minh Le
*Attorney, Agent, or Firm*—Herbert M. Shapiro

[57] ABSTRACT

An encoder of magnetic credit cards and the like includes a slot for the movement of a medium therealong where the slot is wider than the thickness of the medium. Cosequently, the medium may tilt with respect to the planes of the side walls defining the slot. Such an encoder includes a timing wheel which ensures proper encoding of data on the medium even if the medium tilts with respect to the planes of the side walls. To this end, an encoder herein includes a suspension for the timing wheel which permits the wheel to tilt to conform to any tilt assumed by a medium advancing in the slot. A leaf spring of unique design permits the requisite tilt to be realized and has been found to have surprising strength so as to permit the suspension of not only the timing wheel but also a printed circuit board to which the timing wheel may be mounted.

9 Claims, 6 Drawing Sheets

UNIVERSAL MAGNETIC MEDIUM ENCODER WITH TILT-COMPENSATING APPARATUS

FIELD OF THE INVENTION

This invention relates to encoders of magnetic media of different thicknesses and more particularly to such apparatus in which a medium is moved by hand.

BACKGROUND OF THE INVENTION

Encoders for various types of media, such as a magnetic card, a check or a passport, are well known in the art. Universal encoders are apparatus which have a sufficiently wide slot to accept media of different thicknesses. For magnetically encoded media, encoder apparatus includes a write head which extends into the slot from one wall of the apparatus which defines the slot. The head is engaged by the advancing medium and is pushed back into the wall from which it extends. Thus, the width of the slot is adjusted to accommodate the different media.

For encoders of this type, a relatively thin medium frequently is inserted so that the bottom edge of the medium is adjacent to one wall of the slot rather than in the middle of the slot. In such instances, the medium will tilt out of a plane parallel to the slot walls. A check, for example, moving along a slot at an angle tilted with respect to the walls of the slot frequently causes incorrect data to be encoded. The reason for this is that the write head in such an encoder opposes a timing wheel which a moving medium engages. The timing wheel adjusts the encoding of data with respect to the speed at which the medium moves. This speed adjustment is necessary because the position of the data on the medium is critical to ensure proper debiting during a commercial transaction in which the medium is used.

The timing wheel has a specified vertical dimension to provide sufficient friction for the moving medium to ensure that the wheel tracks the medium. If the medium tilts, the medium is not aligned with the surface of the timing wheel, engaging instead only the top or bottom surface of the wheel. Accordingly, the wheel is not moved to track the speed of the medium and any data encoded on the medium is not done so with any reliable timing reference.

BRIEF DESCRIPTION OF THE INVENTION

In accordance with the principles of this invention, the timing wheel for a universal encoder is of a structure to adjust to any tilt in which the medium is positioned. The suspension for timing wheel positions the timing wheel so that the engaging face of the wheel is in a plane parallel to that of the medium regardless of the tilt angle of the medium as it is moved through the slot. To this end, the timing wheel is suspended in a manner which ensures conformity to the tilt angle by a unique leaf spring which permits the wheel to both twist and flex laterally without any significant stress on the leaf spring. The leaf spring is of a unique geometry which enables the required movement of the timing wheel, both lateral and twist, to occur yet is of limited length to fit into the limited space available in such encoders and still exhibit virtually zero stress at the position at which the leaf spring twists.

DETAILED DESCRIPTION OF ILLUSTRATIVE EMBODIMENTS OF THIS INVENTION

Figure 1:
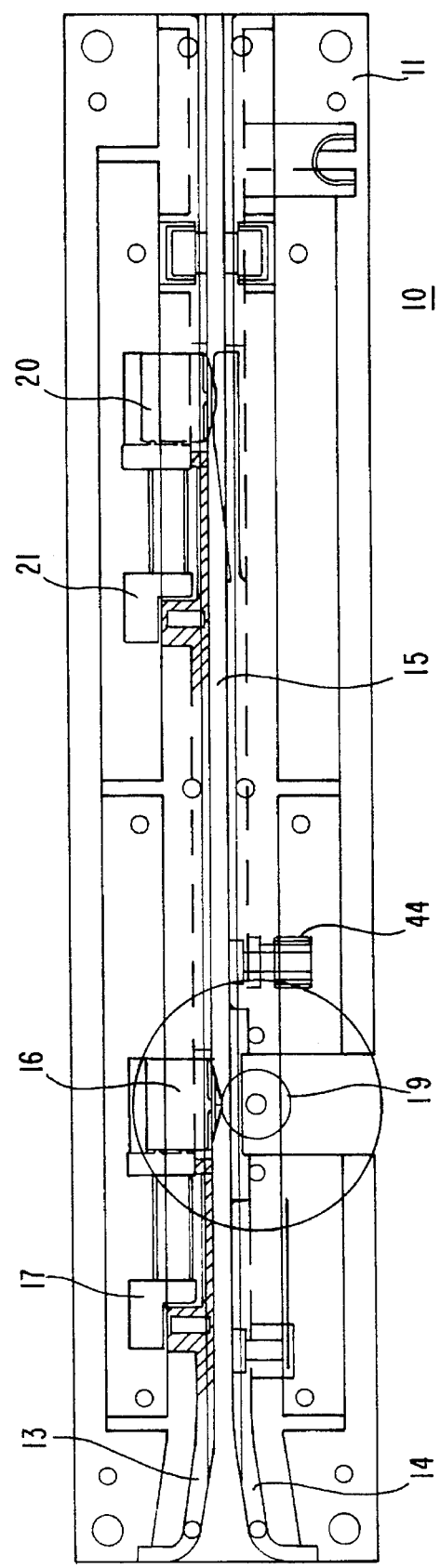
FIG. 1 is a schematic top view of a optical medium encoder in accordance with the principles of this invention.

FIG. 1 shows a top view of a magnetic medium encoder 10. The encoder comprises a base plate 11 to which vertical side walls 13 and 14 extend upwards in spaced apart parallel planes thus forming a slot 15.

A magnetic write head 16 extends through side wall 13 into slot 15 to engage any medium (i.e. magnetic credit card) moved along the slot in a manner familiar to any credit card user. The write head is fastened to a mount 17 on side wall 13 and is suspended from the mount by three stiff wires in a configuration which permits the write head to move in a plane normal to the plane of the slot.

The write head is opposed by a timing wheel 19 which extends into the slot from wall 14. Any card moving, say, from right to left as viewed engages both the write head and the timing wheel, in a manner well understood in the art, to ensure the proper encoding of the card. FIG. 1 also shows a read head 20 suspended from a mount 21 as is head 16.

Figure 2:
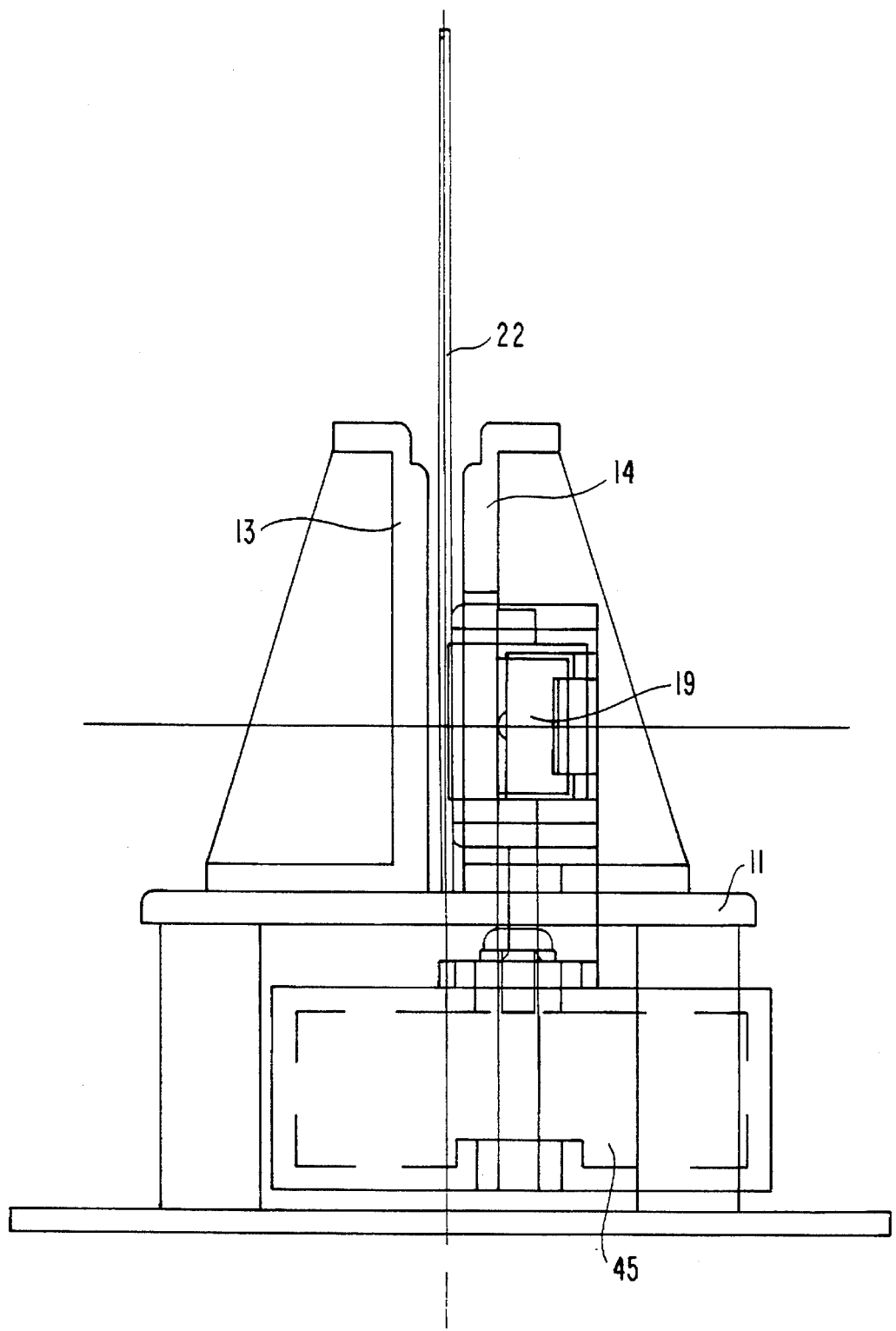
FIGS. 2 and 3 are schematic end views of the encoder of FIG. 1 showing a medium in a perpendicular plane and in a tilted plane respectively.

FIG. 2 shows an end view of the encoder of FIG. 1 viewed from the left in FIG. 1. Card 22 is depicted in a plane parallel to the planes of the side walls 13 and 14. The card is shown in contact with timing wheel 19.

Figure 3:
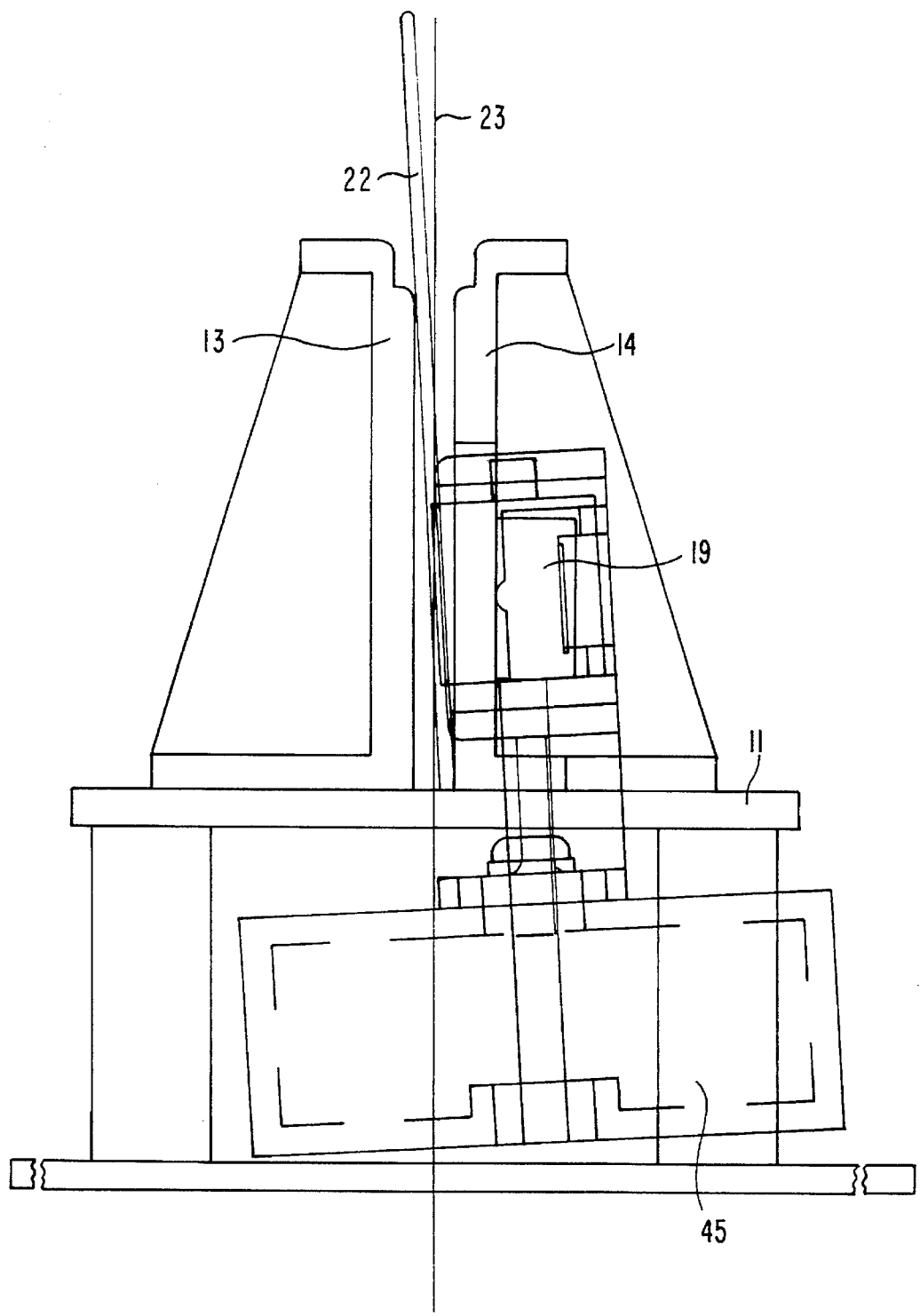

FIG. 3 shows card 22 tilted at an angle with respect to the center line 23 of the slot. The figure also shows the timing wheel in a tilted position so that the face of the wheel aligns with the face of the card to ensure complete contact therebetween. It is this ability to conform to the tilt angle of the card and the arrangement which permits the wheel to so conform to which this invention is directed.

Figure 4:
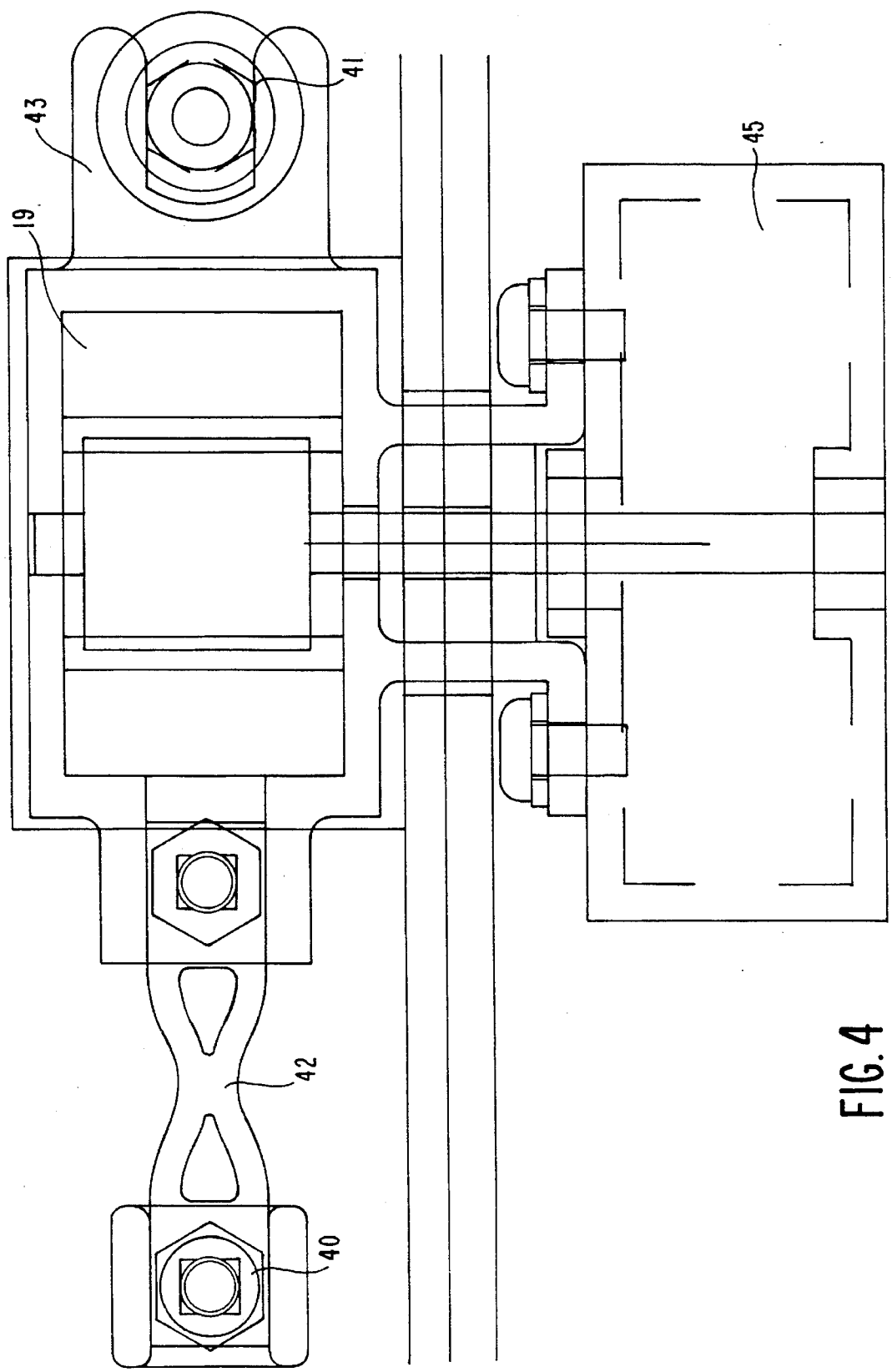
FIG. 4 is an enlarged schematic side view of a timing wheel of the encoder of FIGS. 1, 2, and 3 gimbelled for tracking a tilted medium as shown in FIG. 3.

FIG. 4 shows an enlarged schematic side view of the timing wheel of the encoder of FIGS. 1–3. The timing wheel is bolted to the side wall (14) by bolts 40 and 41, to the former by leaf spring 42 and to the latter via a forked-shaped platen 43 spring mounted to wall 14 using coil spring 44 shown in FIG. 1. The electronic circuitry for the timing wheel is housed in subassembly 45 rigidly connected to the timing wheel as shown in FIGS. 2, 3, and 4.

The leaf spring 42 is of a unique design which permits the tilting of the timing wheel to conform to any tilt angle assumed by a card advancing in the slot of the encoder. The uniqueness of the leaf spring design is such that the stress at the center of the spring is essentially zero and permits twisting of the spring without risk of failure due to stress.. Thus, the spring, having a reduced width at it's center, not only permits flexing into and out of the slot, but also permits the timing wheel to tilt and does so with virtually no stress at the point of twist. The unique selection of flat spring and coil spring (44) allows the timing wheel to move in and out as well as twist with respect to a plane parallel to the walls 13 and 14.

Figure 5:
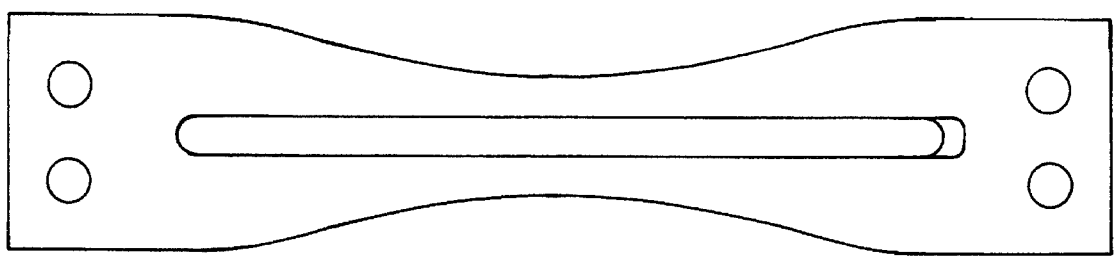
FIGS. 5 and 6 are alternative designs for a zero stress leaf spring of FIG. 4 in accordance with the principles of this invention.
Figure 6:
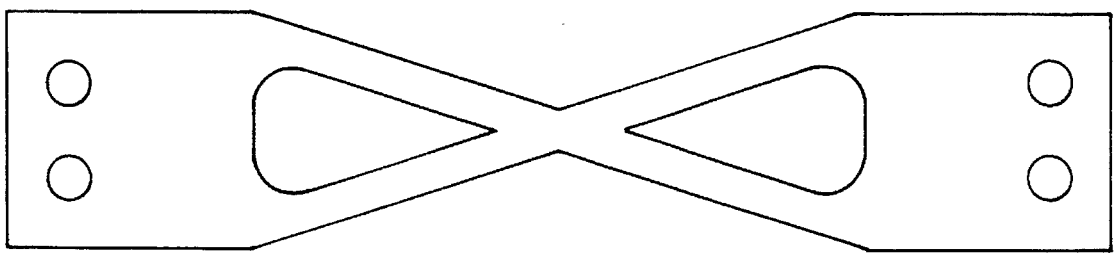

FIG. 4 shows one design for the leaf spring. FIGS. 5 and 6 show alternative designs for the spring. It is clear that all the designs require a flat leaf spring with a reduced width at the center and with material removed from the spring to form apertures in the spring to either side of the center line of the spring. In the absence of the reduced width and the formation of apertures to either side of the center line, the leaf spring resists twist and exhibits considerable stress at the center line leading not only to the inability to conform to the tilt of the card, but also an unreliable lifetime for the spring. The forked geometry of the mounting (see 43 of FIG. 4) as well as a slight enlargement of the space between the tines of the fork allows the timing wheel to move under the control of the springs to conform to the reqisite tilt angle. Experimentation has confirmed that the reduced width for the leaf spring at the center line is essential for permitting the requisite twist to occur.

Figure 7:
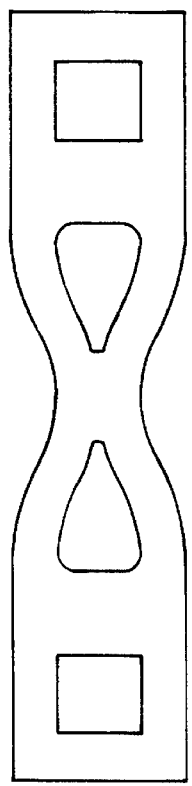
FIG. 7 is a front view of a leaf spring in accordance with the principles of this invention for the spring.

Even with the reduced width, the resulting leaf spring has been found to exhibit surprising strength for the size of the spring. If we consider the limited space available in such an encoder for an arrangement which permits the timing wheel to tilt, the weight of the timing weel subassembly, and the cost constraints on the encoder itself, such an arrangement would seem unrealizable. The leaf spring is only eight thousandths of an inch thick, eight hundred and sixty thousandths long and two,hundred thousandths wide reduced to one hundred thousandths at it's center line. FIG. 7 shows the dimensions of the leaf spring of FIG. 4. The leaf springs of FIGS. 5 and 6 have similar dimensions. The leaf springs are made of hardened steel (17-7 PH), heat treated to CH-900 and photoetched to the geometry shown. Such leaf springs have been found not only to exhibit more than acceptable lifetimes, but also to support such a surprising amount of weight that it could support a printed circuit board as well.

Figure 8:
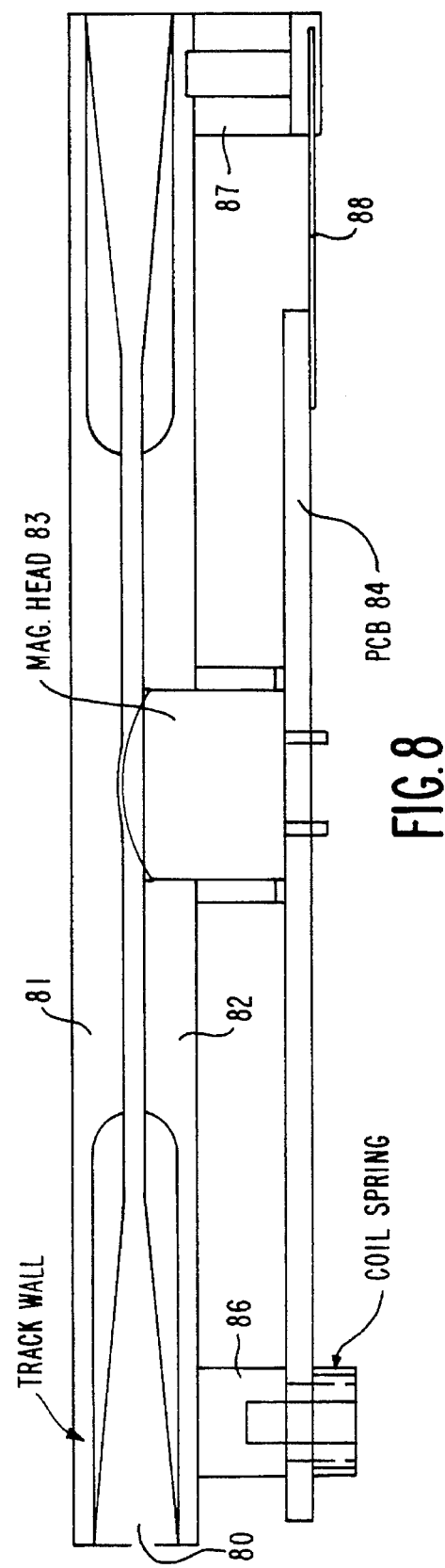
FIG. 8 is a schematic representation of an alternative embodiment in accordance with the principles of this invention.

FIG. 8 shows one such arrangement where a magnetic card encoder with a base plate 80 and side walls 81 and 82 has the magnetic head 83 of the encoder extending through side wall 82. The head, in this embodiment, is attached directly to printed circuit board 84. The printed circuit board is mounted on extension 86, as shown, and connected by leaf spring 88 to extension 87. Leaf spring 88 is of the geometry shown in FIGS. 4, 5, or 6. Head 83, in this embodiment, is free to move along an axis normal to the plane of the slot of the encoder and to tilt to conform to any angle assumed by a medium moving in the slot (see FIG. 3).

The invention has been described in terms of a magnetic card encoder. But the unique leaf spring disclosed herein permits tilting of various other types of apparatus of diminutive geometries and is applicable as well to optical devices and to gimballed printed circuit boards with encoding heads fastened directly to it. The latter arrangement permits a substantial reduction in costs over prior art encoders, obviating, for example, the necessity for the relatively expensive flex cables commonly used in such equipment.

What is claimed is:

1. An encoder for an encodable medium, said encoder including first and second side walls for defining a slot therebetween through which said medium can be moved by hand, each of said side walls having an aperture therethrough, said encoder including a write head extending through said aperture in said first side wall into said slot, said encoder also including a timing wheel extending through said aperture in said second side wall in a position opposing said write head, said timing wheel being mounted on a platen secured at one end thereof to said second side wall via a leaf spring having a center portion thereof of reduced width and secured at the other end thereof via a spring loaded mount thus permitting the timing wheel to move along an axis normal to the plane of said slot and to tilt to conform to any tilt angle along which said medium is moved.

2. An encoder for an encodable medium, said encoder including first and second parallel side walls defining a slot therebetween for the hand movement of said medium therebetween, said encoder including a timing wheel extending into said slot in a position for engaging a medium being moved in said slot, said timing wheel being suspended from said first side wall by a leaf spring having a first width, said width being reduced at about the center line of said spring to permit said wheel to tilt with respect to the planes of said side walls.

3. An encoder as in claim 2 wherein said encoder also includes a magnetic write head also extending into said slot in opposition to said timing wheel for engaging a medium moving therebetween.

4. An encoder as in claim 3 wherein said leaf spring exhibits an arcuate reduction in width with a minimum at the center line of the spring.

5. An encoder as in claim 4 wherein said leaf spring also includes symmetrical cut outs to either side of said center line.

6. An encoder as in claim 3 wherein said leaf spring is characterized by symmetrical linear reductions in width with a minimum at the center line thereof.

7. An encoder as in claim 6 wherein said leaf spring includes a symmetrical cut out to each side of said center line.

8. An encoder as in claim 4 wherein said leaf spring includes a cut out along the length thereof extending to either side of the center line of the spring.

9. An encoder as in claim 1 wherein said write head is a magnetic head, said encoder also encluding a magnetic read head.

* * * * *